US012476382B2

(12) United States Patent
Zhang et al.

(10) Patent No.: US 12,476,382 B2
(45) Date of Patent: Nov. 18, 2025

(54) TERAHERTZ CARRIER SENDING APPARATUS AND TERAHERTZ CARRIER RECEIVING APPARATUS

(71) Applicant: HUAWEI TECHNOLOGIES CO., LTD., Guangdong (CN)

(72) Inventors: Luqi Zhang, Shenzhen (CN); Kun Li, Chengdu (CN); Rui Lyu, Chengdu (CN); Xin Xiao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 208 days.

(21) Appl. No.: 18/216,433

(22) Filed: Jun. 29, 2023

(65) Prior Publication Data

US 2023/0344145 A1 Oct. 26, 2023

Related U.S. Application Data

(63) Continuation of application No. PCT/CN2021/140075, filed on Dec. 21, 2021.

(30) Foreign Application Priority Data

Dec. 31, 2020 (CN) .......................... 202011636176.8

(51) Int. Cl.
*H01Q 21/00* (2006.01)
*H01Q 1/38* (2006.01)
*H01Q 21/28* (2006.01)

(52) U.S. Cl.
CPC .......... *H01Q 21/0062* (2013.01); *H01Q 1/38* (2013.01); *H01Q 21/28* (2013.01)

(58) Field of Classification Search
CPC ...... H01Q 21/0062; H01Q 1/38; H01Q 21/28; H01Q 9/285; H01Q 13/085; H01P 5/087; H04B 3/04; H04B 5/28
See application file for complete search history.

(56) References Cited

U.S. PATENT DOCUMENTS 9,461,706 B1 * 10/2016 Bennett .................... H04B 3/50
9,490,518 B1    11/2016 Herbsommer et al.
(Continued)

FOREIGN PATENT DOCUMENTS

CN    103119714 A    5/2013
CN    109473757 A    3/2019
(Continued)

OTHER PUBLICATIONS

De Wit Maxime et al: "Polymer Microwave Fibers: A New Approach That Blends Wireline,Optical,and Wireless Communication" Jan. 1, 2020,XP011758664,total 16 pages.

*Primary Examiner* — Seung H Lee
(74) *Attorney, Agent, or Firm* — WOMBLE BOND DICKINSON (US) LLP (57) ABSTRACT

The present disclosure describes a terahertz carrier sending apparatus and a terahertz carrier receiving apparatus. The sending apparatus includes a radio frequency sending chip, a mode conversion structure, a terahertz transmission line, and a circuit board. The radio frequency sending chip is packaged on the circuit board, and includes a radio frequency sending circuit, a feed transmission line, and a mode excitation structure. The mode conversion structure includes a metal inner wall, configured to couple a terahertz signal excited by the mode excitation structure into the terahertz transmission line. The terahertz transmission line is configured to transmit the terahertz signal. The receiving apparatus includes a similar part in a receiving direction. The subject matter herein implements efficient electromagnetic coupling and improves data transmission bandwidth.

18 Claims, 10 Drawing Sheets

(56) References Cited

U.S. PATENT DOCUMENTS

| | | | |
|---|---|---|---|
| 9,819,397 B2 * | 11/2017 | McCormack | G06F 13/00 |
| 10,581,141 B2 * | 3/2020 | Nguyen | H01Q 1/38 |
| 2016/0036114 A1 | 2/2016 | Okada | |
| 2017/0324135 A1 | 11/2017 | Blech et al. | |
| 2020/0169291 A1 | 5/2020 | Cho et al. | |

FOREIGN PATENT DOCUMENTS

| | | | |
|---|---|---|---|
| EP | 4199250 A1 | | 6/2023 |
| JP | 2004289371 A | * | 10/2004 |

* cited by examiner

TERAHERTZ CARRIER SENDING APPARATUS AND TERAHERTZ CARRIER RECEIVING APPARATUS

CROSS-REFERENCE TO RELATED APPLICATIONS

This application is a continuation of International Application No. PCT/CN2021/140075, filed on Dec. 21, 2021, which claims priority to Chinese Patent Application No. 202011636176.8, filed on Dec. 31, 2020. The disclosures of the aforementioned applications are hereby incorporated by reference in their entireties.

TECHNICAL FIELD

Embodiments of the disclosure relate to the field of terahertz communication, and in particular, to a terahertz carrier sending apparatus and a terahertz carrier receiving apparatus.

BACKGROUND

With rapid growth of traffic in a network data center, a requirement for a transmission rate between devices in the data center is increasingly high, and a large quantity of high-speed cables are required for interconnection between cabinets and inside the cabinets in the data center. A connection manner for short-range communication is using a direct attach copper cable. However, as operating frequency increases, an increased metal loss largely limits a transmission distance and a transmission rate of the copper cable. Another connection manner is using an optical cable. However, because optical-to-electrical conversion is required for transmitting and receiving, power consumption and costs are greatly increased.

Currently, there is another interconnection manner, that is, using a terahertz (THz) frequency band as a carrier, and using a terahertz transmission line as a transmission medium, to perform interconnection in a short-range high-speed communication scenario. In a conventional technology, a radiator on a radio frequency chip radiates a terahertz signal to a terahertz transmission line through free space, and transmits the signal to a receiving end through the terahertz transmission line. In this manner, a radiation gain is low, and electromagnetic coupling efficiency is low. Therefore, transmission bandwidth of a system is reduced.

SUMMARY

Embodiments of the present disclosure provide a terahertz carrier sending apparatus and a terahertz carrier receiving apparatus, to implement efficient electromagnetic coupling and improve data transmission bandwidth.

According to a first aspect, an embodiment provides a terahertz carrier sending apparatus, including a radio frequency sending chip, a mode conversion structure, a terahertz transmission line, and a circuit board. The radio frequency sending chip is packaged on the circuit board, and includes a radio frequency sending circuit, a feed transmission line, and a mode excitation structure. The mode conversion structure includes a metal inner wall, configured to couple a terahertz signal excited by the mode excitation structure into the terahertz transmission line. The terahertz transmission line is configured to transmit the terahertz signal. In this way, efficient electromagnetic coupling is implemented, and data transmission bandwidth is improved.

In a possible design, the mode excitation structure includes a top metal layer and a bottom metal layer, and a dielectric layer is included between the top metal layer and the bottom metal layer. Therefore, coupling efficiency is further improved.

In still another possible design, a thickness of the dielectric layer is between 1.5 times and 200 times that of a larger one between the top metal layer and the bottom metal layer. Therefore, coupling efficiency is further improved.

In still another possible design, the dielectric layer includes one or more layers of dielectric materials. Therefore, coupling efficiency is further improved.

In still another possible design, the excitation structure at the top metal layer and the excitation structure at the bottom metal layer are linearly tapered slot antennas or dipole antenna structures. Therefore, coupling efficiency is further improved.

In still another possible design, the radio frequency sending chip further includes an impedance matching structure, configured to match impedance between the feed transmission line and the mode excitation structure. Therefore, coupling efficiency is further improved.

In still another possible design, the mode conversion structure includes a positioning slot, configured to insert a part of the circuit board into the mode conversion structure, so that a phase center of the mode excitation structure is on a geometric central axis of the mode conversion structure. Therefore, coupling efficiency is further improved.

In still another possible design, an inner cross section of the mode conversion structure is a square, a rectangle, an ellipse, or a circle, and correspondingly, an outer contour of a cross section of the transmission line is a square, a rectangle, an ellipse, or a circle. Therefore, use adaptability is further improved.

In still another possible design, a material of the mode conversion structure is metal or a dielectric material. Therefore, coupling efficiency is further improved.

In still another possible design, the circuit board is a pluggable module, and adopts a packaging manner such as QSFP, SFP, CXP, CX4, CFP, or CDFP. Therefore, availability is improved.

In still another possible design, a plurality of radio frequency sending chips are packaged on the circuit board. Therefore, transmission efficiency of a system is improved.

According to a second aspect, an embodiment provides a terahertz carrier receiving apparatus, including a terahertz transmission line, a mode conversion structure, a radio frequency receiving chip, and a circuit board. The terahertz transmission line is configured to transmit a terahertz signal. The mode conversion structure includes a metal inner wall, configured to couple the terahertz signal in the terahertz transmission line into a mode excitation structure of the radio frequency receiving chip. The radio frequency receiving chip is packaged on the circuit board, and includes a mode excitation structure, a feed transmission line, and a radio frequency receiving circuit. In this way, efficient electromagnetic coupling is implemented, and data transmission bandwidth is improved.

In still another possible design, the mode excitation structure includes a top metal layer and a bottom metal layer, and a dielectric layer is included between the top metal layer and the bottom metal layer. Therefore, coupling efficiency is further improved.

In still another possible design, a thickness of the dielectric layer is between 1.5 times and 200 times that of a larger one between the top metal layer and the bottom metal layer. Therefore, coupling efficiency is further improved.

In still another possible design, the dielectric layer includes one or more layers of dielectric materials. Therefore, coupling efficiency is further improved.

In still another possible design, the excitation structure at the top metal layer and the excitation structure at the bottom metal layer are linearly tapered slot antennas or dipole antenna structures. Therefore, coupling efficiency is further improved.

In still another possible design, the radio frequency receiving chip further includes an impedance matching structure, configured to match impedance between the feed transmission line and the mode excitation structure. Therefore, coupling efficiency is further improved.

In still another possible design, the mode conversion structure includes a positioning slot, configured to insert a part of the circuit board into the mode conversion structure, so that a phase center of the mode excitation structure is on a geometric central axis of the mode conversion structure. Therefore, coupling efficiency is further improved.

In still another possible design, an inner cross section of the mode conversion structure is a square, a rectangle, an ellipse, or a circle, and correspondingly, an outer contour of a cross section of the transmission line is a square, a rectangle, an ellipse, or a circle. Therefore, use adaptability is further improved.

In still another possible design, a material of the mode conversion structure is metal or a dielectric material. Therefore, coupling efficiency is further improved.

In still another possible design, the circuit board is a pluggable module, and adopts a packaging manner such as QSFP, SFP, CXP, CX4, CFP, or CDFP. Therefore, availability is improved.

In still another possible design, a plurality of radio frequency receiving chips are packaged on the circuit board. Therefore, transmission efficiency of a system is improved.

DESCRIPTION OF EMBODIMENTS

To make objectives, technical solutions, and advantages of the present disclosure clearer, the following further describes implementations of the present disclosure in detail with reference to accompanying drawings.

A terahertz carrier sending apparatus and a terahertz carrier receiving apparatus provided in embodiments of the present disclosure may be applied to a high-speed interconnection scenario, for example, a data center. The terahertz carrier sending apparatus and the terahertz carrier receiving apparatus may form a unidirectional transceiver cable, and one end of the unidirectional transceiver cable sends a terahertz signal and the other end receives a terahertz signal. The terahertz carrier sending apparatus and the terahertz carrier receiving apparatus may also form a bidirectional transceiver cable, and each end of the bidirectional transceiver cable sends a terahertz signal to the opposite end and receives a terahertz signal from the opposite end.

Figure 1:
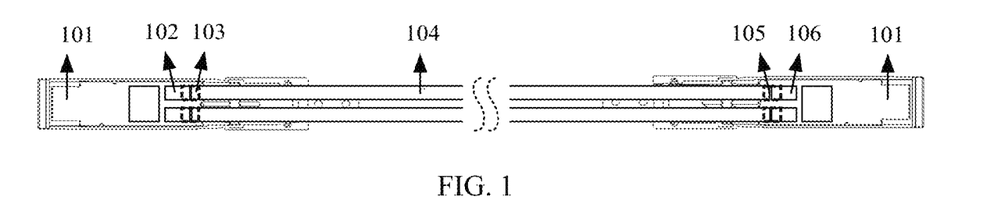
FIG. 1 is a diagram of a pluggable bidirectional terahertz cable according to an embodiment of the present disclosure.

FIG. 1 is a pluggable bidirectional terahertz cable according to an embodiment of the present disclosure, including connector parts and transmission line parts at both ends. The connector part at one end of the cable includes a circuit board 101, a terahertz radio frequency sending chip 102 packaged on the circuit board, and a mode conversion structure 103. The mode conversion structure 103 is configured to couple a terahertz signal output by the radio frequency sending chip into a terahertz transmission line 104. The connector part at the other end of the cable includes a mode conversion structure 105 and a terahertz radio frequency receiving chip 106. The mode conversion structure 105 is configured to couple a terahertz signal transmitted through the terahertz transmission line 104 into the radio frequency receiving chip 106. In this way, a unidirectional communication link for a terahertz carrier is formed. The cable shown in FIG. 1 includes two unidirectional transceiver links. Therefore, a bidirectional transceiver terahertz cable is formed.

The radio frequency sending chip and the radio frequency receiving chip at a same end of the bidirectional cable may be integrated into one chip, and the chip is a radio frequency transceiver chip. The terahertz cable can be used to implement bidirectional transmitting and receiving through one cable, and can also be used to implement transmission in two directions at two different terahertz frequencies. In this case, one mode conversion structure may be used for bidirectional coupling, and may not only couple a terahertz signal output by the radio frequency sending chip into the terahertz transmission line, but also couple a terahertz signal transmitted in the terahertz transmission line into the radio frequency receiving chip.

Packaging of the connector part of the bidirectional terahertz cable may be similar to that of a conventional optical module, and a standard packaging manner such as QSFP, SFP, CXP, CX4, CFP, or CDFP is adopted. In addition, a baseband signal processing chip may be integrated with the radio frequency transceiver chip, or may be packaged on a board of a service device.

Figure 2:
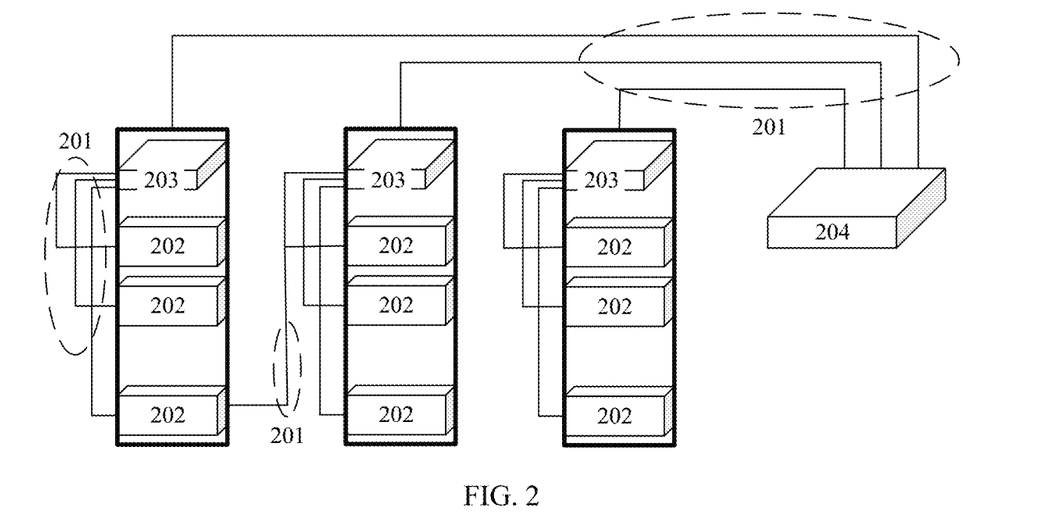
FIG. 2 is a diagram of applying a terahertz cable to a data center according to an embodiment of the present disclosure.

As shown in FIG. 2, a terahertz carrier sending and receiving apparatus (which is usually a bidirectional terahertz cable) may be applied to data transmission between devices in a data center. The bidirectional terahertz cable 201 may be applied between service devices 202 and a cabinet top switch 203 in a same cabinet, may be applied between the service device 202 and the cabinet top switch 203 in another cabinet, or may be applied between the cabinet top switch 203 and a convergence switch 204.

Figure 3:
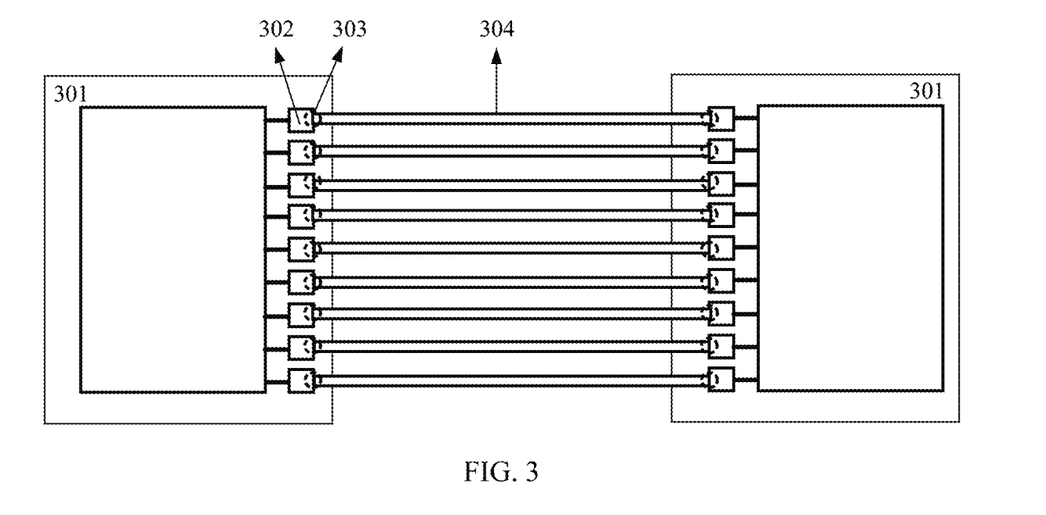
FIG. 3 is a diagram of communication devices connected through a plurality of pairs of terahertz transmission lines according to an embodiment of the present disclosure.

To further improve a data transmission rate between devices, boards of two devices may be interconnected through a plurality of pairs of terahertz cables. For example, as shown in FIG. 3, boards 301 of devices at two communication ends are connected through a plurality of pairs of terahertz transmission lines. A plurality of radio frequency transceiver chips 302 are installed on the boards 301 of the devices, and each radio frequency transceiver chip 302 is coupled to the terahertz transmission line 304 through the mode conversion structure 303, to receive and transmit a terahertz signal. In this way, direct on-board high-density interconnection can be implemented between two devices.

Figure 4:
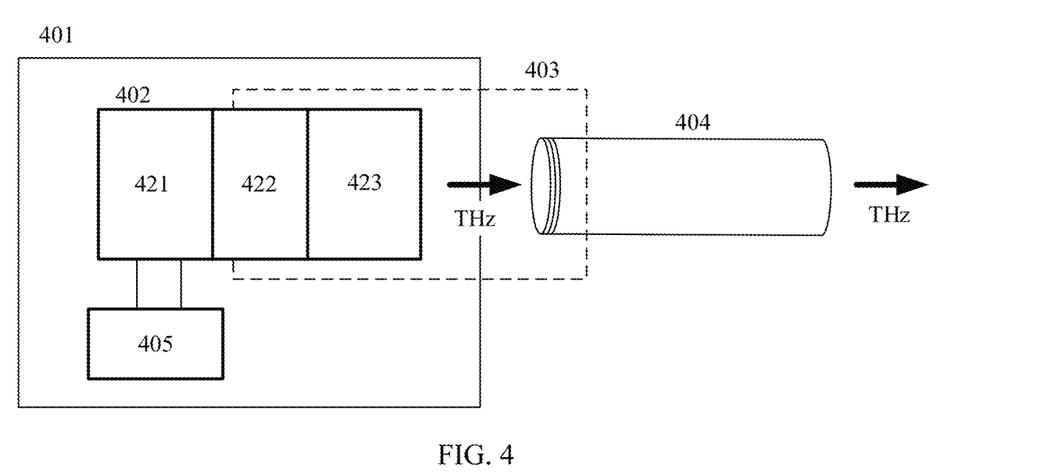
FIG. 4 is a diagram of a structure of a terahertz carrier sending apparatus according to an embodiment of the present disclosure.

A structure of the terahertz carrier sending apparatus provided in this embodiment of the present disclosure is shown in FIG. 4, and includes a printed circuit board (PCB) 401, a radio frequency sending chip 402, a mode conversion structure 403, and a terahertz transmission line 404. The radio frequency sending chip 402 includes a radio frequency sending circuit 421, a feed transmission line 422, and a mode excitation structure 423. A terahertz signal is generated by the radio frequency sending circuit 421 and output to the mode excitation structure 423 through the feed transmission line 422. The mode conversion structure 403 couples the terahertz signal in the mode excitation structure 423 into the terahertz transmission line 404, and transmits the terahertz signal to a receiver. In FIG. 4, a baseband signal processing chip 405 is further packaged on the PCB. Alternatively, the baseband signal processing chip may not be packaged in the terahertz carrier sending apparatus, but is packaged on a service processing board of a transmitting device.

Figure 5:
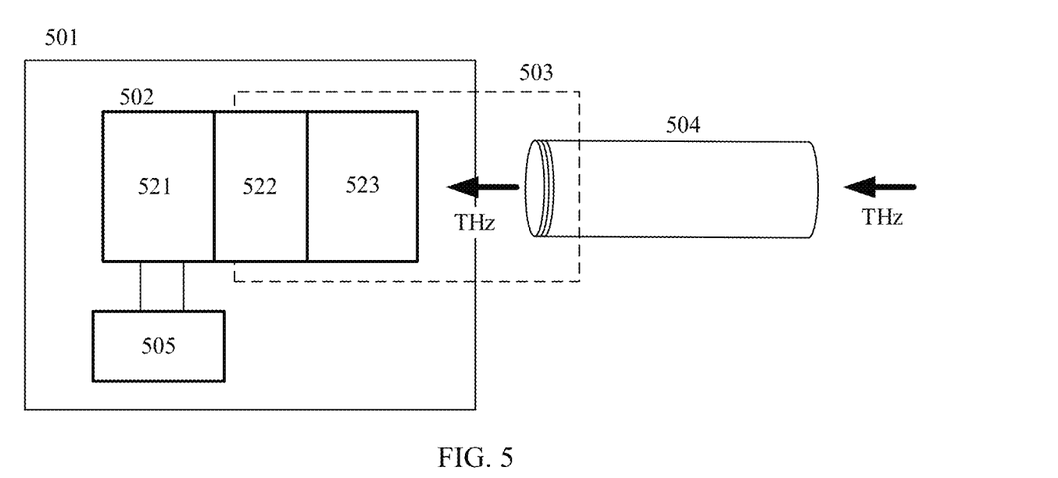
FIG. 5 is a diagram of a structure of a terahertz carrier receiving apparatus according to an embodiment of the present disclosure.

A schematic diagram of a structure of the terahertz carrier receiving apparatus according to an embodiment of the present disclosure is shown in FIG. 5, and the terahertz carrier receiving apparatus includes a printed circuit board (PCB) 501, a radio frequency receiving chip 502, a mode conversion structure 503, and a terahertz transmission line 504. The radio frequency receiving chip 502 includes a mode excitation structure 523, a feed transmission line 522, and a radio frequency receiving circuit 521. The mode excitation structure 523 couples a terahertz signal received through the terahertz transmission line 504 into the mode excitation structure 523, and transmits the terahertz signal to the radio frequency receiving circuit 521 through the feed transmission line 522. A baseband signal processing chip 505 is further packaged on the PCB board shown in FIG. 5.

Similarly, the baseband signal processing chip may not be packaged in the terahertz carrier receiving apparatus, but is packaged on a service processing board of a receiving device.

During bidirectional communication, a terahertz carrier sending apparatus and a terahertz carrier receiving apparatus at a communication end may be combined into one transceiver apparatus. The radio frequency sending chip 402 and the radio frequency receiving chip 502 may be combined into one radio frequency transceiver chip, and the transceiver apparatus includes a radio frequency sending circuit and a radio frequency receiving circuit (referred to as a radio frequency transceiver circuit below), a feed transmission line, and a mode excitation structure. The feed transmission line and the mode excitation structure may be used for both signal transmission and signal reception. The mode conversion structure and the terahertz transmission line may also be used for transmission and reception. The following uses an example for description.

Figure 6:
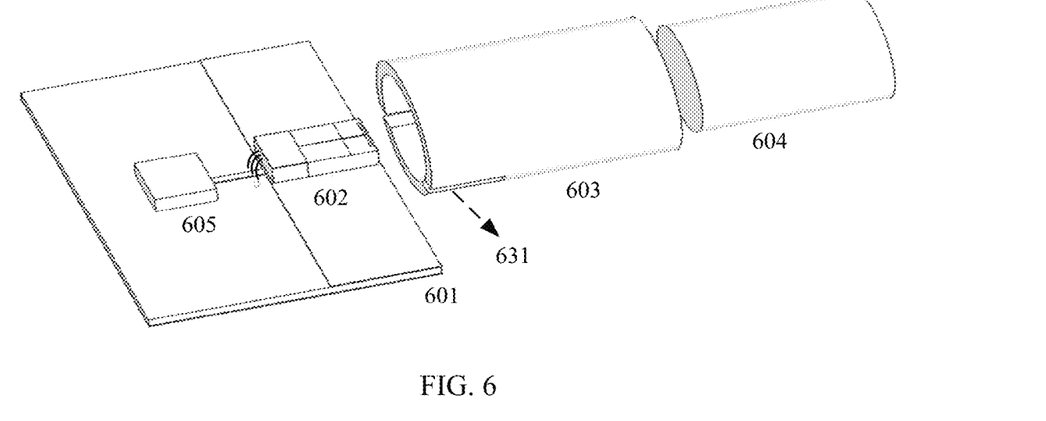
FIG. 6 is a diagram of a three-dimensional structure of a terahertz carrier transceiver apparatus according to an embodiment of the present disclosure.

FIG. 6 is a schematic diagram of a three-dimensional structure of components of a terahertz carrier transceiver apparatus according to an embodiment of the present disclosure, and the terahertz carrier transceiver apparatus includes a printed circuit board (PCB) 601, a radio frequency transceiver chip 602, a mode conversion structure 603, and a terahertz transmission line 604. In addition, a baseband signal processing chip 605 is further packaged on the PCB.

Figure 7A:
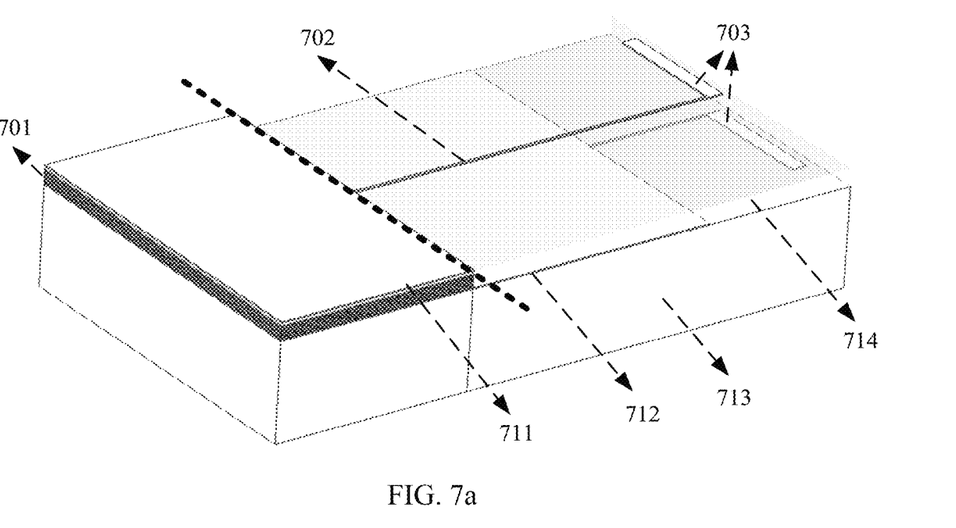
FIG. 7a is a diagram of a three-dimensional structure of a radio frequency transceiver chip according to an embodiment of the present disclosure.
Figure 7B:
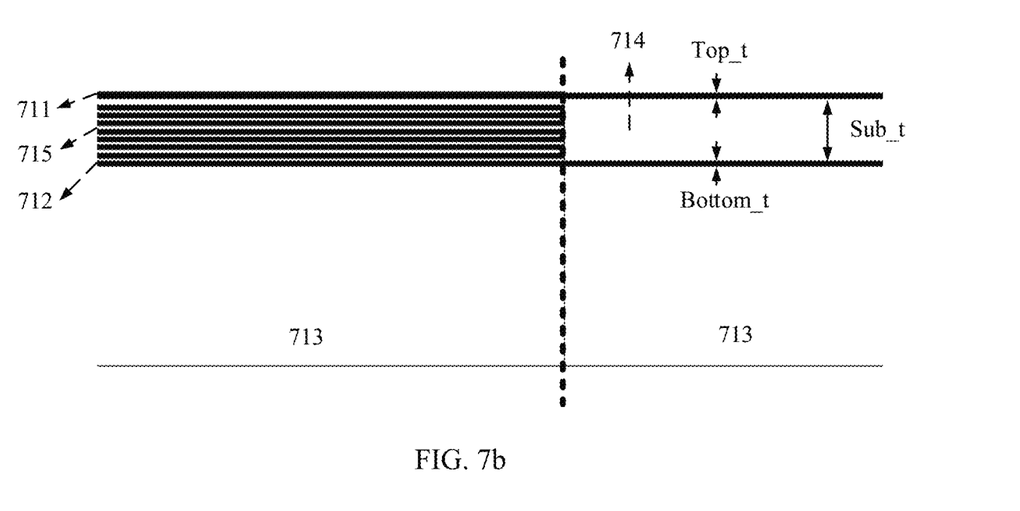
FIG. 7b is a cross-sectional view of a radio frequency transceiver chip according to an embodiment of the present disclosure.

A schematic diagram of a three-dimensional structure of a radio frequency transceiver chip is shown in FIG. 7a, and the radio frequency transceiver chip includes a radio frequency transceiver circuit 701, a feed transmission line 702, and a mode excitation structure 703. Further, refer to FIG. 7b. FIG. 7b is a cross-sectional view of the radio frequency transceiver chip shown in FIG. 7a. In the figure, a left part of the dashed line corresponds to the radio frequency transceiver circuit 701, and a right part of the dashed line corresponds to the feed transmission line 702 and the mode excitation structure 703.

When the chip is manufactured, a standard CMOS chip may generally be used. On a silicon-based substrate 713, an on-chip feed transmission line, a metal ground, and an on-chip mode excitation structure are constructed by using a top metal layer 711, a bottom metal layer 712, and a dielectric layer 714 between the top metal layer 711 and the bottom metal layer 712 together. In an embodiment, a part or all of a metal distribution structure 715 between the feed transmission line and the on-chip mode excitation structure is etched off by using a standard CMOS chip processing technology, to form one or more layers of dielectric layers.

The mode excitation structure 703 may be a linearly tapered slot antenna structure, or may be a dipole antenna structure. FIG. 7a shows the mode excitation structure 703 in the dipole antenna structure. An example of the mode excitation structure 703 in the linearly tapered slot antenna structure is described later. The dielectric layer between the top metal layer 711 and the bottom metal 712 may be a single layer or a plurality of layers. A thickness Sub t of the dielectric layer is controlled between 1.5 to 200 times that of a larger one between the top metal layer and the bottom metal layer, that is, the following formula 1 condition is met.

$$1.5 \times \text{Max}(\text{Top\_}t, \text{Bottom\_}t) \leq \text{Sub\_}t \leq 200 \times \text{Max}(\text{Top\_}t, \text{Bottom\_}t) \quad \text{(Formula 1)}$$

Top_t is a thickness of the top metal layer, and Bottom t is a thickness of the bottom metal layer. The foregoing condition enables the feed transmission line on the chip to have large enough end face impedance, to connect to and match with the mode conversion structure.

With reference to FIG. 6, FIG. 7a, and FIG. 7b, it can be learned that an inner wall of the mode conversion structure 603 is metal, and an inner cavity enclosed by the metal inner wall is coupled to the mode excitation structure of the radio frequency transceiver chip. For a transmitting end, a to-be-sent terahertz signal is transmitted from the radio frequency sending circuit to the mode excitation structure, and the mode conversion structure 603 couples the terahertz signal in the mode excitation structure 703 into the terahertz transmission line for sending. Alternatively, for a receiving end, the mode conversion structure 603 couples a terahertz signal received by the terahertz transmission line into the mode excitation structure 703, and then transmits the terahertz signal to the radio frequency receiving circuit for processing.

The inner cavity enclosed by the metal inner wall of the mode conversion structure 603 may be columnar, and a cross section of the inner cavity may be a circle, a rectangle, or the like. An outer contour of the mode conversion structure 603 may be a cylinder, a cuboid shape, or the like, and a cross section of the mode conversion structure 603 may be a circle, a rectangle, or the like. To improve coupling efficiency, a rectangular positioning slot 631 may be provided at an eccentric position of the inner cavity, and is configured to locate and fasten the PCB board 601. The PCB board 601 is inserted into the eccentric rectangular positioning slot 631, so that the on-chip mode excitation structure of the radio frequency transceiver chip 602 is located in the inner cavity of the mode conversion structure. A height and a depth of the rectangular slot and a position relationship between the rectangular slot and the PCB board are set, to ensure that an equivalent phase center of the on-chip mode excitation structure 703 is on a geometric central axis of the mode conversion structure 603. Therefore, high-efficiency coupling can be implemented.

The terahertz transmission line 604 may be inserted into the mode conversion structure 603, to form a terahertz radio frequency link. The terahertz transmission line may be a solid core transmission line or a hollow core transmission line. A cross section of the terahertz transmission line may be a circle, a rectangle, or other shapes. A service signal enters the terahertz radio frequency link through a baseband signal processing chip at the transmitting end, and is transmitted to the receiving end. Then, the service signal is converted into a service signal through a baseband signal processing chip at the receiving end. In this way, high-speed interconnection of service signals is implemented.

Figure 8A:
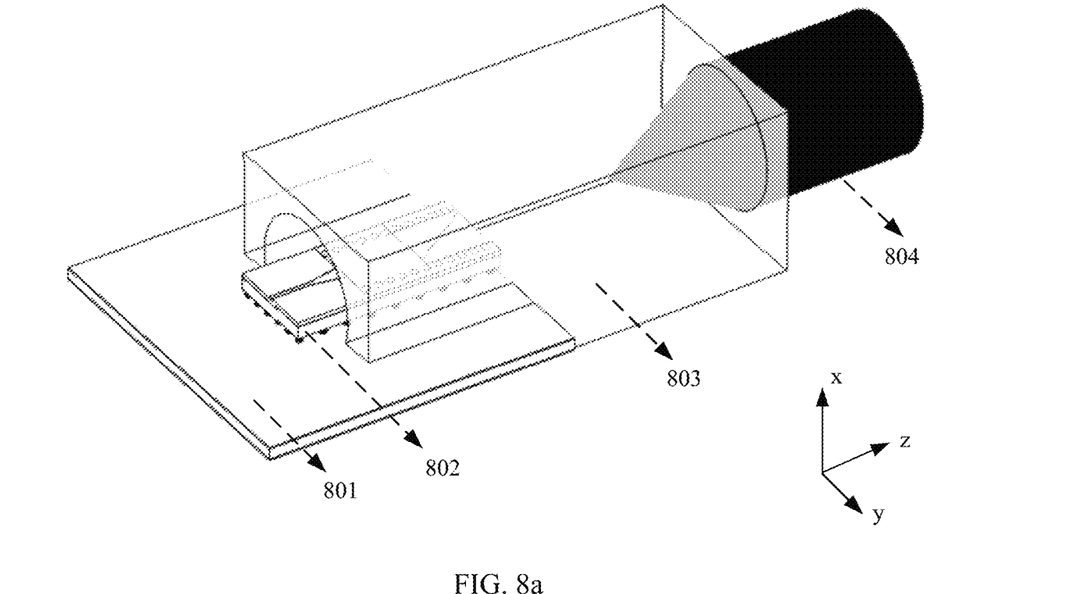
FIG. 8a is a three-dimensional diagram of a packaged terahertz carrier transceiver apparatus according to an embodiment of the present disclosure.
Figure 8B:
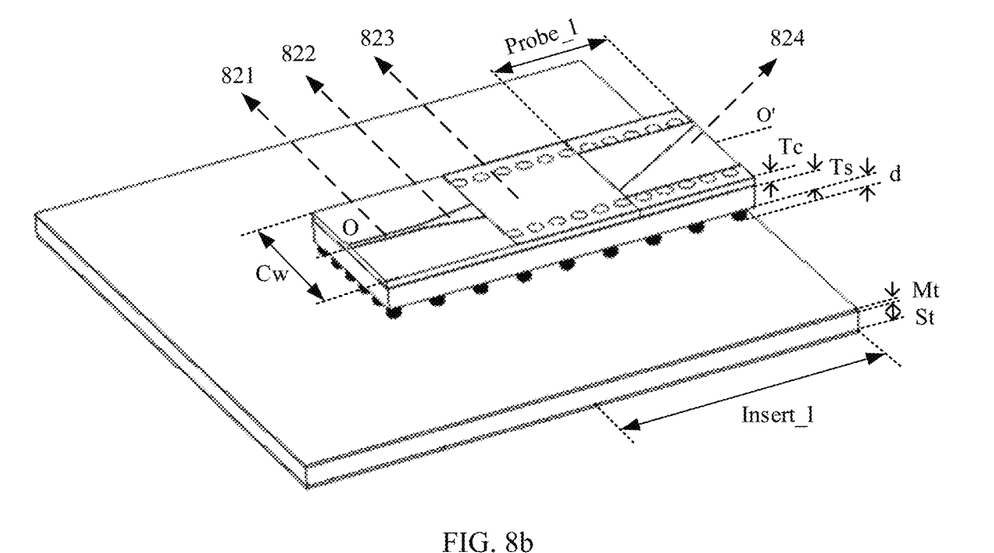
FIG. 8b is a diagram of detailed structural dimensions of a radio frequency transceiver chip according to an embodiment of the present disclosure.

As shown in FIG. 8a, FIG. 8a is a three-dimensional schematic diagram of a packaged terahertz carrier transceiver apparatus according to an embodiment of the present disclosure, and the terahertz carrier transceiver apparatus includes a printed circuit board (PCB) 801, a radio frequency transceiver chip 802, a mode conversion structure 803, and a terahertz transmission line 804. The following uses a CMOS process as an example to describe a detailed design of the terahertz carrier transceiver apparatus. A structure of the radio frequency transceiver chip 802 is shown in FIG. 8b, and the radio frequency transceiver chip 802 includes a feed transmission line 821, a tapered microstrip line 822, a substrate integrated waveguide 823, and a mode excitation structure 824.

In a CMOS chip process, an M1 metal layer is bottom metal, and an M9 metal layer is top metal. In a feed transmission line area and a mode excitation structure area of the chip, all metal between M1 and M9 is etched away, to form a plurality of layers of equivalent dielectric layers. A top metal layer in the on-chip feed transmission line area is a microstrip structure of the on-chip feed transmission line, an equivalent dielectric layer is a dielectric substrate, and a bottom metal layer is a metal ground. The on-chip feed transmission line 821 is connected to a radio frequency transceiver circuit.

The radio frequency transceiver chip further has a tapered microstrip line 822, the tapered microstrip line 822 is a first segment of an impedance matching structure, and the tapered microstrip line 822 implements connection between the on-chip feed transmission line 821 and the substrate integrated waveguide 823. The on-chip tapered microstrip line 822 also uses a top metal layer as an on-chip microstrip structure, an equivalent dielectric layer as a dielectric substrate, and a bottom metal layer as a metal ground.

The substrate integrated waveguide 823 on the radio frequency transceiver chip is a second segment of the impedance matching structure, and uses top layer metal and bottom layer metal in the chip respectively as upper and lower layers of metal of the substrate integrated waveguide, and an equivalent dielectric layer is used as an intermediate dielectric layer. The on-chip feed transmission line 821 is connected to an on-chip radiator, that is, the mode excitation structure 824, through the tapered microstrip line 822, and the substrate integrated waveguide 823.

The on-chip mode excitation structure 824 shown in FIG. 8b uses an end-fire linearly tapered slot antenna, and has a triangular metal patch radiator on both a top metal layer and a bottom metal layer. The two metal patch radiators are mirror-symmetric along a y-axis direction shown in the figure by using a central axis of the equivalent dielectric layer as a center line.

Figure 8C:
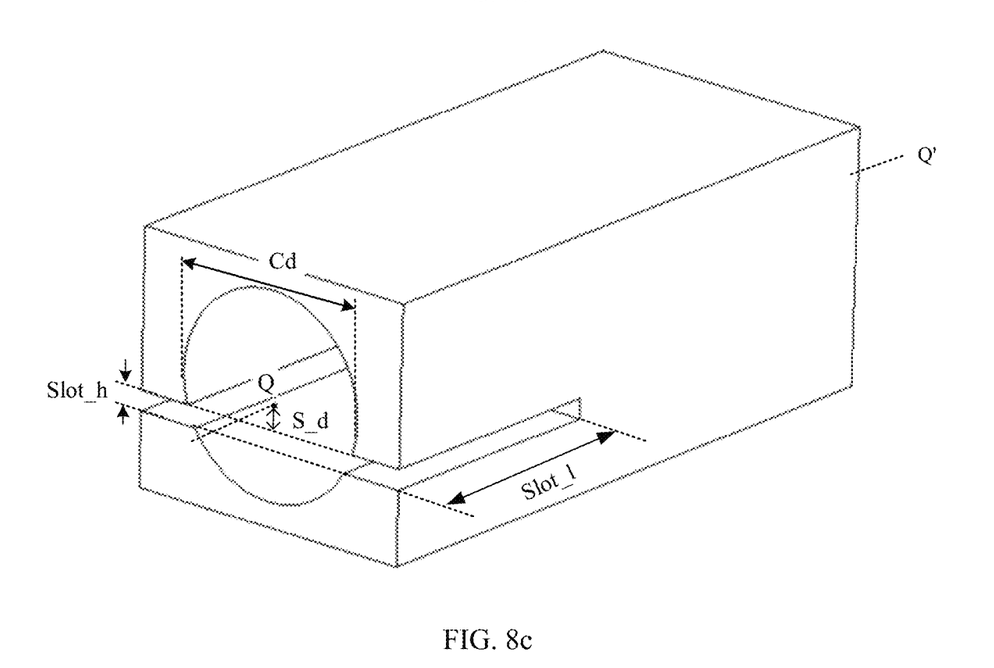
FIG. 8c is a diagram of detailed structural dimensions of a mode conversion structure according to an embodiment of the present disclosure.

A structure of the mode conversion structure 803 is shown in FIG. 8c. An inner wall of the mode conversion structure 803 forms a cylindrical inner cavity, a material of the inner wall is metal, and an outer contour of the mode conversion structure 803 is a square cylinder. A rectangular positioning slot is provided in an eccentric direction of an x-axis of the mode conversion structure 803, and the PCB board is aligned with and fastened to the positioning slot, so that a part or all of the on-chip feed transmission line and the mode excitation structure on the radio frequency transceiver chip 802 can be inserted into the mode conversion structure. In this way, an axis of an equivalent phase center of the on-chip mode excitation structure coincides with a central axis of the cylindrical inner cavity of the metal mode conversion structure. Therefore, high-efficiency coupling can be implemented.

One end of the terahertz transmission line 804 that is inserted into the mode conversion structure 803 has a tapered structure that can couple a terahertz signal into the transmission line. On a receiving side, the other end of the solid core dielectric terahertz transmission line with a same tapered structure is inserted into the mode conversion structure, so that a terahertz signal in the transmission line can be coupled into the mode excitation structure in the radio frequency receiving chip, to form a terahertz radio frequency link. Therefore, high-speed interconnection of high-speed service signals from a transmitting end to a receiving end can be implemented.

Further, when related dimensions of the PCB board 801, the radio frequency transceiver chip 802, and the mode conversion structure 803 meet certain conditions, coupling of terahertz signals can be better implemented. As shown in FIG. 8b and FIG. 8c, the conditions that these dimensions need to meet include the following formulas 2, 3, and 4.

A position relationship between the mode conversion structure 803 and the radio frequency transceiver chip 802 meets the following:

$$0.5 \times Tc + Ts + d = S\_d \quad \text{(Formula 2)}$$

Tc is a thickness from the top metal layer to the bottom metal layer of the radio frequency transceiver chip, Ts is a thickness of the silicon-based substrate of the radio frequency transceiver chip, d is a height from the silicon-based substrate of the chip to the PCB board, and S_d is an eccentric distance of the rectangular positioning slot. A diameter Cd of the inner cavity of the mode conversion structure 803 should be greater than or equal to a width Cw of the radio frequency transceiver chip 802.

A position relationship between the mode conversion structure 803 and the PCB board 801 meets the following:

$$Slot\_h = 2 \times Mt + St \quad \text{(Formula 3)}$$

Slot_h is a height of the rectangular positioning slot of the mode conversion structure 803, Mt is a thickness of a top metal layer of the PCB board, Mt is a thickness of a bottom metal layer of the PCB board, and St is a thickness of a middle layer of the PCB board.

A relationship between the on-chip mode excitation structure 824 and the mode conversion structure meets the following:

$$Insert\_1 = Slot\_1 > Probe\_1 \quad \text{(Formula 4)}$$

Insert_1 is a depth at which the PCB board is inserted into the mode conversion structure, Slot_1 is a depth of the rectangular positioning slot of the mode conversion structure, and Probe_1 is a length of the on-chip mode excitation structure.

In addition, a central axis OO of a dielectric substrate of the on-chip mode excitation structure 824 should coincide with a central axis QQ of the mode conversion structure 803, that is, the two central axes need to coincide and need to be less than a set error range during installation.

Technical effects of embodiments of the present disclosure may be briefly described through electromagnetic simulation. According to the conditions provided in the embodiment shown in FIG. 8a, including formulas 2 to 4, simulation is performed by using a 65 nm silicon-based CMOS chip process as an example. The terahertz transmission line is a solid core wire with a round section, a diameter of 1.65 mm and a material of polytetrafluoroethylene. The circular cross-sectional diameter of the cylindrical inner cavity of the mode conversion structure is set to be 1.65 mm, which is the same as the diameter of the terahertz transmission line. A width Cw of the radio frequency transceiver chip is 1.40 mm, a metal thickness of the M9 layer is 3.40 µm, a metal thickness of the M1 layer is 0.77 µm, a thickness of the equivalent dielectric layer is 10.28 µm, a length Probe 1 of an excitation probe is 0.80 mm, and a length Insert 1 for the chip to enter the mode conversion structure is 2.00 mm.

Figure 9A:
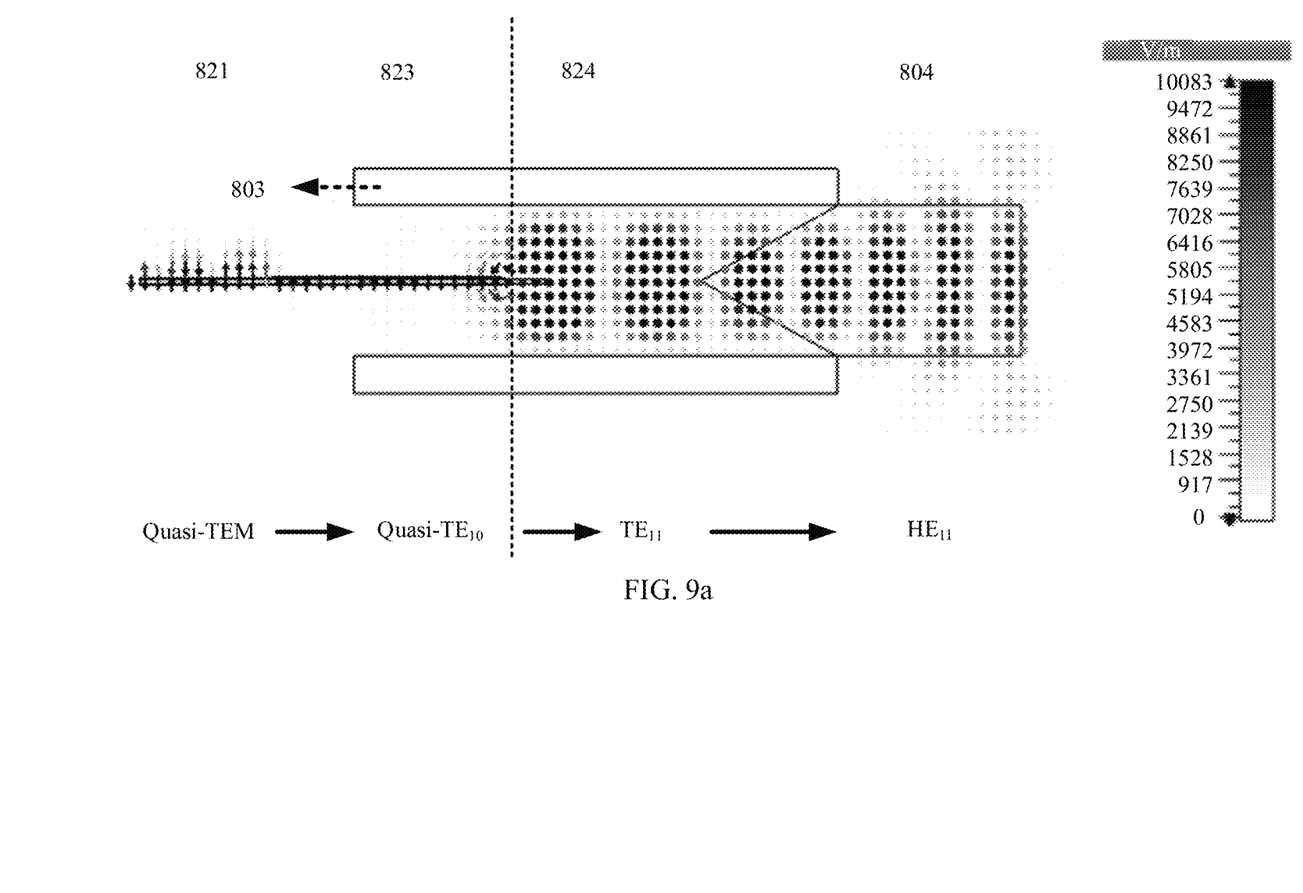
FIG. 9a is a diagram of electric field mode distribution of electromagnetic simulation according to an embodiment of the present disclosure.

Under the foregoing conditions, a schematic diagram of electric field mode distribution shown in FIG. 9a may be obtained through electromagnetic simulation calculation. An electromagnetic signal is connected from the radio frequency sending circuit to the on-chip substrate integrated waveguide 823 through the on-chip feed microstrip line 821, to convert from a quasi-transverse electro-magnetic (TEM) mode to a quasi-transverse electro 10 ($TE_{10}$) mode. Then, the electromagnetic signal is transmitted to the linearly tapered slot mode excitation structure 824, to excite a transmission fundamental mode transverse electro 11 ($TE_{11}$) mode in the circular metal mode conversion structure, and an electromagnetic wave is coupled, through the mode conversion structure 803, into the solid core terahertz transmission line 804 with a tapered end face, to implement fundamental mode transmission in a hybrid electro 11 ($HE_{11}$) mode. It can be learned from FIG. 9a that efficient mode-field conversion of electromagnetic signals can be implemented by using the on-chip mode conversion structure. According to simulation calculation, in a frequency range of 140 GHz to 170 GHz, a transmission parameter from the radio frequency sending circuit to the terahertz transmission line is greater than −4 dB. This indicates that coupling efficiency from the radio frequency sending circuit to the terahertz transmission line is very high. Therefore, a link interconnection length can be significantly increased by using such a terahertz transceiver.

Figure 9B:
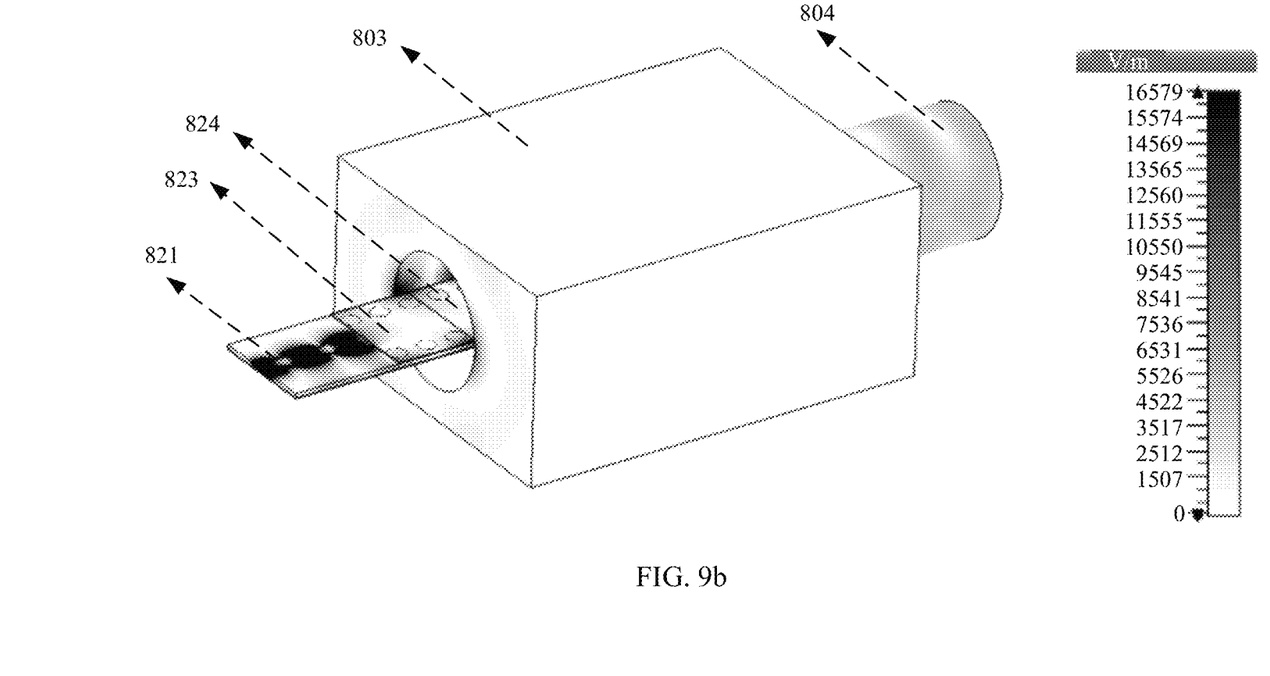
FIG. 9b is a diagram of spatial electric field distribution of electromagnetic simulation according to an embodiment of the present disclosure.

In addition, a schematic diagram of spatial electric field distribution shown in FIG. 9b may also be obtained through electromagnetic simulation calculation. From FIG. 9b, it can be learned that an electromagnetic signal is fed from the on-chip microstrip line 821, enters the mode excitation structure 824 through the substrate integrated waveguide 823, and is coupled into the solid core terahertz transmission line 804 through the mode conversion structure 803. There is almost no electromagnetic energy leakage in space. This indicates that this embodiment of the present disclosure has good electromagnetic shielding performance, excellent anti-electromagnetic interference capability, and further improves transmission bandwidth.

Figure 10A:
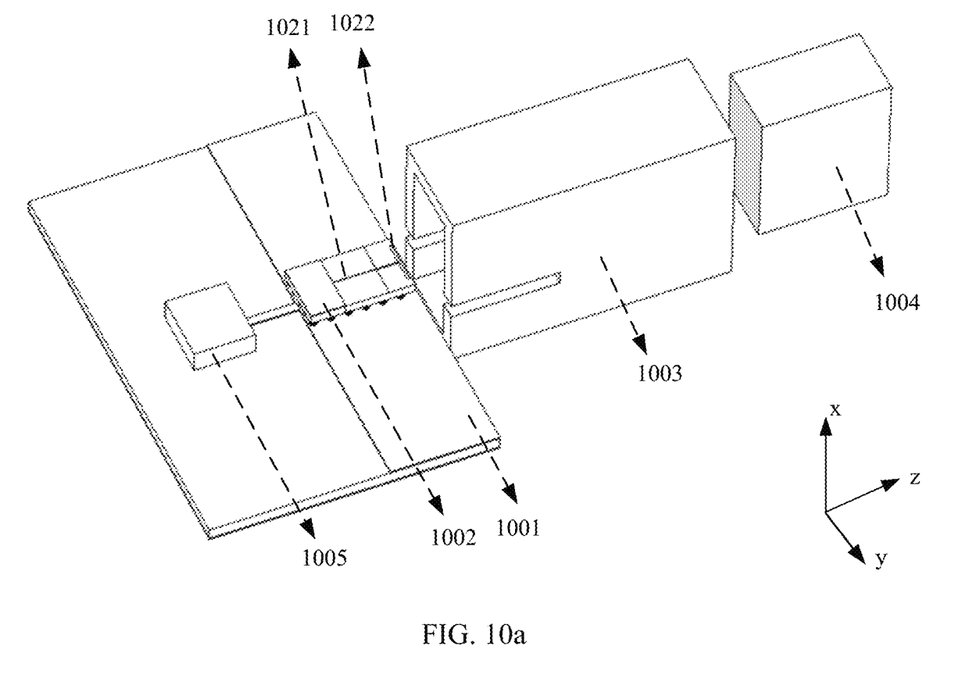
FIG. 10a is a diagram of another terahertz transceiver apparatus according to an embodiment of the present disclosure.

An embodiment of the present disclosure further provides a terahertz transceiver apparatus, as shown in FIG. 10a. A mode excitation structure 1022 on a radio frequency transceiver chip 1002 uses a dipole antenna, and feeds the dipole antenna through an on-chip microstrip line 1021, and the on-chip dipole antenna has an L-shaped metal patch radiator on both a top metal layer and a bottom metal layer. The two metal radiators are mirror-symmetric along a y-axis direction as shown in the figure, and use an axis of an equivalent dielectric layer as a center line. A cross section of an inner cavity of a mode conversion structure 1003 is rectangular, a material of an inner wall of the mode conversion structure 1003 is metal, and a cross section of an outer contour of the mode conversion structure 1003 is also rectangular. A terahertz transmission line 1004 has a rectangular cross section, a cross section dimension of the terahertz transmission line 1004 is the same as an inner wall dimension of a cross section of the mode conversion structure, and the terahertz transmission line 1004 may be inserted into the mode conversion structure 1003.

Figure 10B:
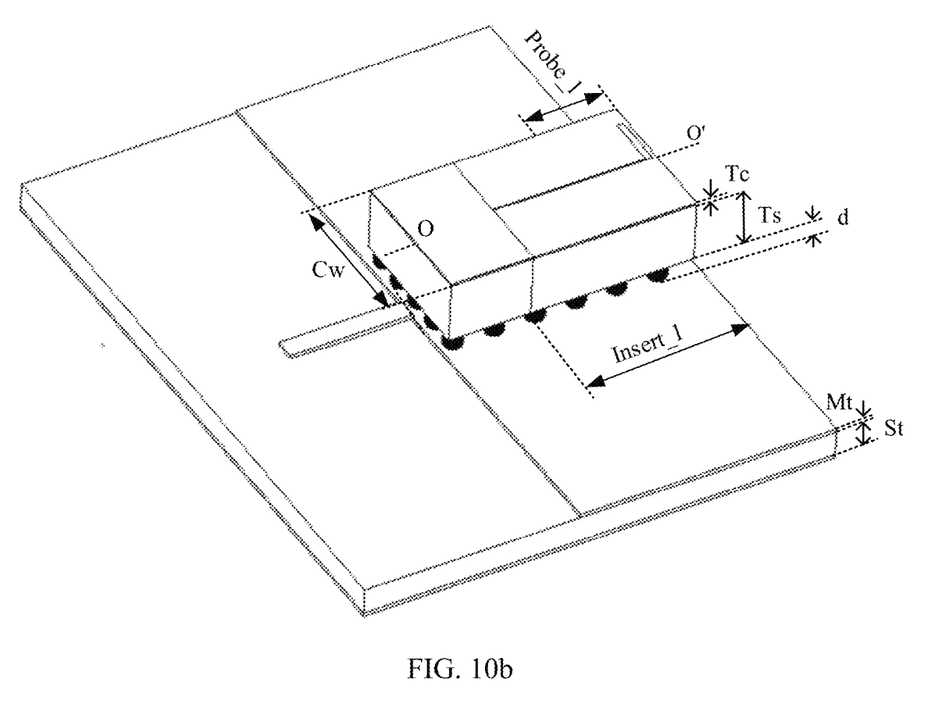
FIG. 10b is a diagram of structural dimensions of another radio frequency transceiver chip according to an embodiment of the present disclosure.
Figure 10C:
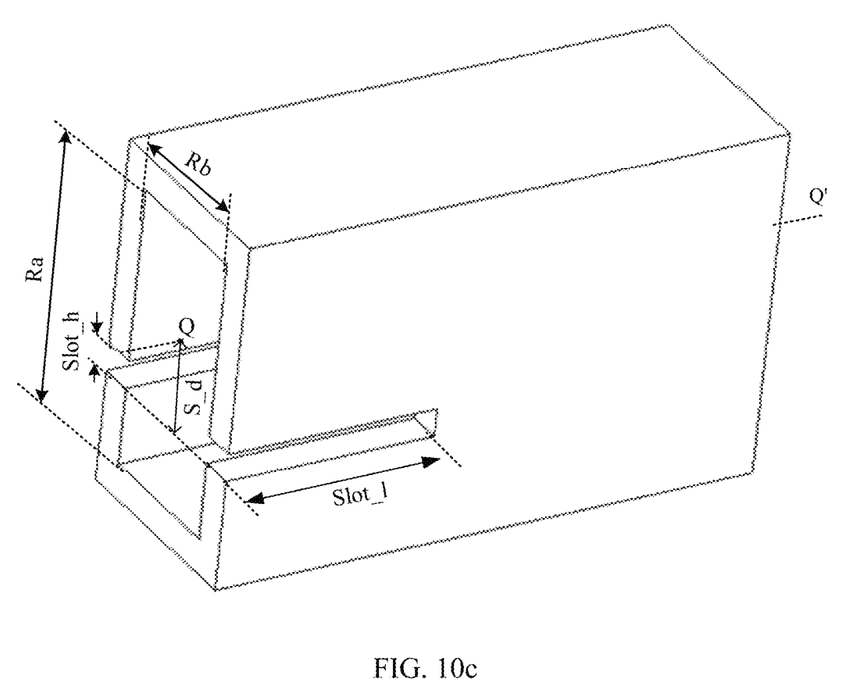
FIG. 10c is a diagram of structural dimensions of another mode conversion structure according to an embodiment of the present disclosure.

Similar to those shown in FIG. 8b and FIG. 8c, to implement better coupling, related dimensions of the radio frequency transceiver apparatus also need to meet corresponding conditions. As shown in FIG. 10b and FIG. 10c, the mode conversion structure 1003 is provided with a rectangular positioning slot in an x-axis eccentric direction, and all the feed part and the mode excitation part on the radio frequency transceiver chip 1002 may be inserted into the mode conversion structure 1003. The PCB board 1001 is aligned with and fastened to and the rectangular positioning slot, so that it can be ensured that an axis on which an equivalent phase center in the on-chip mode excitation structure is located coincides with a central axis of the metal mode conversion structure. Therefore, high-efficiency coupling can be implemented. The conditions that related dimensions need to meet include the following formulas 5, 6, and 7.

A position relationship between the mode conversion structure 1003 and the radio frequency transceiver chip 1002 needs to meet the following:

$$0.5 \times Tc + Ts + d = S\_d \quad \text{(Formula 5)}$$

Tc is a thickness from the top metal layer to the bottom metal layer of the radio frequency transceiver chip, Ts is a thickness of the silicon-based substrate of the radio frequency transceiver chip, d is a height from the silicon-based substrate of the chip to the PCB board, and S_d is an eccentric distance of the rectangular positioning slot. A length Rb of the inner cavity of the mode conversion structure 1003 along the y-axis direction should be greater than or equal to a width Cw of the radio frequency transceiver chip 1002.

A position relationship between the mode conversion structure 1003 and the PCB board 1001 meets the following:

$$Slot\_h = 2 \times Mt + St \quad \text{(Formula 6)}$$

Slot_h is a height of the rectangular positioning slot of the mode conversion structure 1003, Mt is a thickness of a top metal layer of the PCB board, Mt is a thickness of a bottom metal layer of the PCB board, and St is a thickness of a middle layer of the PCB board.

A relationship between the on-chip mode excitation structure and the mode conversion structure meets the following:

$$Insert\_1 = Slot\_1 > Probe\_1 \quad \text{(Formula 7)}$$

Insert_1 is a depth at which the PCB board is inserted into the mode conversion structure, Slot_1 is a depth of the rectangular positioning slot of the mode conversion structure, and Probe_1 is a length of the on-chip mode excitation structure.

In addition, a central axis OO of a dielectric substrate of the on-chip mode excitation structure 1022 should coincide with a central axis QQ of the mode conversion structure 1003, that is, the two central axes need to coincide and need to be less than a set error range during installation.

Figure 11:
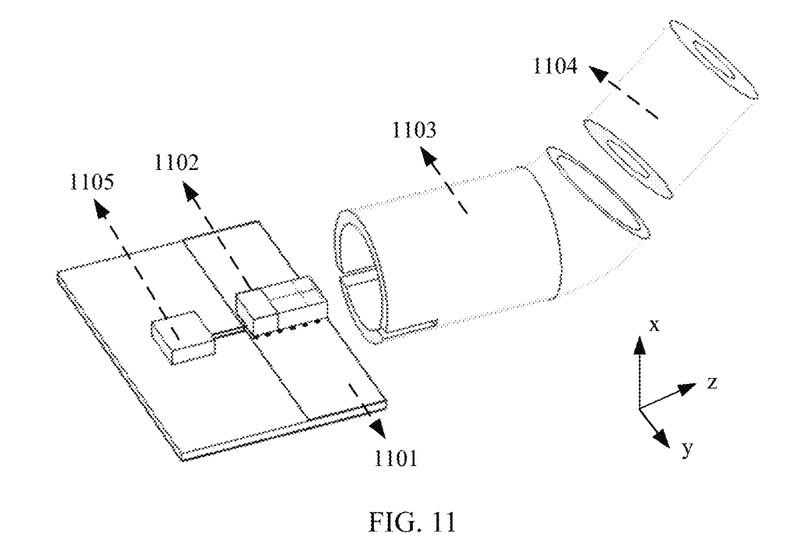
FIG. 11 is a diagram of a mode conversion structure with a curved end face according to an embodiment of the present disclosure.

An embodiment of the present disclosure further provides a terahertz transceiver apparatus, as shown in FIG. 11. A mode conversion structure 1103 uses a curved end face structure, so that non-parallel coupling between a terahertz transmission line and a radio frequency transceiver chip can be implemented, and adaptation of the terahertz transceiver apparatus can be improved.

Although the present disclosure is described with reference to embodiments, in a process of implementing the present disclosure that claims protection, persons skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a case of multiple.

Although the present disclosure is described with reference to particular features and embodiments thereof, apparently, various modifications and combinations may be made to the present disclosure. Correspondingly, the specification and accompanying drawings are merely example descriptions of the present disclosure defined by the appended claims, and is considered as any of or all modifications, variations, combinations or equivalents that cover the scope of the present disclosure. It is clear that a person skilled in the art may make various modifications and variations to the present disclosure without departing from the scope of the present disclosure. The present disclosure is intended to cover these modifications and variations provided that they fall within the scope of protection defined by the following claims and their equivalent technologies.

What is claimed is:

1. A terahertz carrier sending apparatus, comprising:
   a terahertz transmission line;
   a circuit board;
   a radio frequency sending chip packaged on the circuit board, and comprising a radio frequency sending circuit, a feed transmission line, and a mode excitation structure; and
   a mode conversion structure comprising a metal inner wall, configured to couple a terahertz signal excited by the mode excitation structure into the terahertz transmission line, and wherein the terahertz transmission line is configured to transmit the terahertz signal, wherein the mode excitation structure comprises a top metal layer and a bottom metal layer, and a dielectric layer is disposed between the top metal layer and the bottom metal layer.

2. The terahertz carrier sending apparatus according to claim 1, wherein a thickness of the dielectric layer is between 1.5 times and 200 times that of a larger one between the top metal layer and the bottom metal layer.

3. The terahertz carrier sending apparatus according to claim 1, wherein the dielectric layer comprises one or more layers of dielectric materials.

4. The terahertz carrier sending apparatus according to claim 1, wherein the mode excitation structure at the top metal layer and the mode excitation structure at the bottom metal layer are linearly tapered slot antennas.

5. The terahertz carrier sending apparatus according to claim 1, wherein the excitation structure at the top metal layer and the excitation structure at the bottom metal layer are dipole antenna structures.

6. The terahertz carrier sending apparatus according to claim 1, wherein the radio frequency sending chip further comprises an impedance matching structure, configured to match impedance between the feed transmission line and the mode excitation structure.

7. The terahertz carrier sending apparatus according to claim 1, wherein the mode conversion structure comprises a positioning slot, configured to insert a part of the circuit board into the mode conversion structure, so that a phase center of the mode excitation structure is on a geometric central axis of the mode conversion structure.

8. The terahertz carrier sending apparatus according to claim 1, wherein an inner cross section of the mode conversion structure is a square, a rectangle, an ellipse, or a circle, and correspondingly, an outer contour of a cross section of the transmission line is a square, a rectangle, an ellipse, or a circle.

9. The terahertz carrier sending apparatus according to claim 1, wherein a material of the mode conversion structure is metal or a dielectric material.

10. The terahertz carrier sending apparatus according to claim 1, wherein the circuit board is a pluggable module, and adopts a packaging manner including QSFP, SFP, CXP, CX4, CFP, or CDFP.

11. The terahertz carrier sending apparatus according to claim 1, wherein a plurality of radio frequency sending chips are integrated into a plurality of radio frequency transceiver chips, and the plurality of radio frequency transceiver chips are packaged on the circuit board.

12. A terahertz carrier receiving apparatus, comprising:
    a terahertz transmission line configured to transmit a terahertz signal;
    a circuit board;

a radio frequency receiving chip packaged on the circuit board, and comprising a mode excitation structure, a feed transmission line, and a radio frequency receiving circuit; and a mode conversion structure comprising a metal inner wall, configured to couple the terahertz signal to the mode excitation structure of the radio frequency receiving chip, wherein the mode excitation structure comprises a top metal layer and a bottom metal layer, and a dielectric layer is disposed between the top metal layer and the bottom metal layer.

13. The terahertz carrier receiving apparatus according to claim 12, wherein a thickness of the dielectric layer is between 1.5 times and 200 times that of a larger one between the top metal layer and the bottom metal layer.

14. The terahertz carrier receiving apparatus according to claim 12, wherein the dielectric layer comprises one or more layers of dielectric materials.

15. The terahertz carrier receiving apparatus according to claim 12, wherein the excitation structure at the top metal layer and the excitation structure at the bottom metal layer are linearly tapered slot antennas.

16. The terahertz carrier receiving apparatus according to claim 12, wherein the excitation structure at the top metal layer and the excitation structure at the bottom metal layer are dipole antenna structures.

17. The terahertz carrier receiving apparatus according to claim 12, wherein the radio frequency receiving chip further comprises an impedance matching structure, configured to match impedance between the feed transmission line and the mode excitation structure.

18. The terahertz carrier receiving apparatus according to claim 12, wherein the mode conversion structure comprises a positioning slot, configured to insert a part of the circuit board into the mode conversion structure, so that a phase center of the mode excitation structure is on a geometric central axis of the mode conversion structure.

* * * * *